US011993236B2

(12) United States Patent
Kim (10) Patent No.: US 11,993,236 B2
(45) Date of Patent: May 28, 2024

(54) ELECTRONIC BRAKE SYSTEM AND CONTROL METHOD THEREFOR

(71) Applicant: HL MANDO CORPORATION, Gyeonggi-do (KR)

(72) Inventor: Young Jae Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 846 days.

(21) Appl. No.: 17/055,579

(22) PCT Filed: May 17, 2019

(86) PCT No.: PCT/KR2019/005934
§ 371 (c)(1),
(2) Date: Nov. 14, 2020

(87) PCT Pub. No.: WO2019/221550
PCT Pub. Date: Nov. 21, 2019

(65) Prior Publication Data
US 2021/0107438 A1  Apr. 15, 2021

(30) Foreign Application Priority Data

May 17, 2018  (KR) .................. 10-2018-0056577

(51) Int. Cl.
*B60T 13/74* (2006.01)
*B60T 7/04* (2006.01)
*B60T 13/68* (2006.01)

(52) U.S. Cl.
CPC ............ *B60T 7/042* (2013.01); *B60T 13/686* (2013.01); *B60T 13/745* (2013.01);
(Continued)

(58) Field of Classification Search
CPC .. B60T 13/745; B60T 2220/04; B60T 8/4081; B60T 8/4059; B60T 7/042
See application file for complete search history.

(56) References Cited

U.S. PATENT DOCUMENTS 5,558,409 A * 9/1996 Walenty .................. B60T 7/042
                                                        303/155
8,364,367 B2 * 1/2013 Karnjate ............... B60T 8/3275
                                                         701/70
(Continued)

FOREIGN PATENT DOCUMENTS

JP    2016-175445   10/2016
KR    1999-0047086   7/1999
(Continued)

OTHER PUBLICATIONS

International Search Report for PCT/KR2019/005934 dated Sep. 11, 2019 and its English translation from WIPO (now published as WO 2019/221550).
(Continued)

*Primary Examiner* — Bradley T King
(74) *Attorney, Agent, or Firm* — Ladas & Parry, LLP (57) ABSTRACT

An electronic brake system includes a caliper provided on each wheel configured to perform braking, a detector configured to measure a driver's step force or detect a braking pressure generated by the caliper and a controller controls a rotational speed of the motor based on a first rotation speed of the motor calculated based on a change in the magnitude of the braking pressure generated by the caliper, and a second rotation speed of the motor based on a change in the magnitude of the step force when the change in the magnitude of the step force satisfies a predetermined criterion.

18 Claims, 5 Drawing Sheets

(52) U.S. Cl.
CPC ..... *B60T 2220/04* (2013.01); *B60Y 2400/306* (2013.01); *B60Y 2400/81* (2013.01)

(56) References Cited

U.S. PATENT DOCUMENTS

| | | | |
|---|---|---|---|
| 9,315,180 B2 | 4/2016 | Jungbecker et al. | |
| 11,679,746 B2* | 6/2023 | Ko | B60T 8/3255 701/70 |
| 11,745,713 B2* | 9/2023 | Lee | B60T 13/662 303/114.1 |
| 2013/0289845 A1* | 10/2013 | Ajiro | B60T 13/745 701/70 |
| 2014/0375114 A1* | 12/2014 | Daniels | B60T 8/17 303/10 |
| 2015/0112567 A1* | 4/2015 | Toelge | B60T 13/662 701/70 |
| 2017/0297545 A1* | 10/2017 | Kim | B60T 8/172 |
| 2019/0061722 A1* | 2/2019 | Kaihara | B60T 8/409 |
| 2020/0331447 A1* | 10/2020 | Lee | B60T 17/221 |
| 2021/0114574 A1* | 4/2021 | Fujita | B60T 13/745 |
| 2022/0185118 A1* | 6/2022 | Li | B60T 7/042 |

FOREIGN PATENT DOCUMENTS

| | | |
|---|---|---|
| KR | 10-2012-0082088 | 7/2012 |
| KR | 10-2014-0005563 | 1/2014 |
| KR | 10-2016-0039823 | 4/2016 |
| KR | 10-2017-0066726 | 6/2017 |
| KR | 10-2017-0118524 | 10/2017 |

OTHER PUBLICATIONS

Written Opinion of the International Searching Authority for PCT/KR2019/005934 dated Sep. 11, 2019 and its English translation by Google Translate (now published as WO 2019/221550).

* cited by examiner

FIG. 5

ELECTRONIC BRAKE SYSTEM AND CONTROL METHOD THEREFOR

CROSS-REFERENCE TO RELATED APPLICATIONS

This application is the U.S. National Stage of International Patent Application No. PCT/KR2019/005934 filed on May 17, 2019, which claims the priority to Korean Patent Application No. 10-2018-0056577 filed in the Korean Intellectual Property Office on May 17, 2018, the entire contents of which are incorporated herein by reference.

TECHNICAL FIELD

Embodiments of the present disclosure relate to an electronic brake system and a method for controlling the same, and more particularly to an electronic brake system for controlling the magnitude of braking force based on change in the magnitude of pressure applied to a brake pedal.

BACKGROUND ART

The number of users who use vehicles as simple transportation means in modern society is rapidly increasing. With rapid development of vehicle technology, users or people who use vehicles can easily enjoy long distance travel, resulting in a high standard of living in daily life.

A vehicle may include a brake system that controls a vehicle running on a road to be decelerated or stopped as necessary.

Examples of brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake system with a brake traction control system.

Generally, an electronically controlled brake system includes a hydraulic-pressure supply device. Once a driver depresses a brake pedal, the hydraulic-pressure supply device senses displacement of the pedal through a pedal displacement sensor, and receives an electric signal indicating the driver's braking intention from the pedal displacement sensor, such that pressure is supplied to the wheel cylinder.

The hydraulic-pressure supply device is configured to operate a motor in response to a pedal effort applied to a brake pedal, such that brake pressure is generated. In this case, the brake pressure may allow rotational force of the motor to be converted into rectilinear motion and presses a piston, resulting in the occurrence of brake pressure.

DISCLOSURE

Technical Problem

Therefore, it is an aspect of the present disclosure to provide a brake system for preventing occurrence of residual pressure in a hydraulic-pressure supply device when pressure applied to a brake pedal is reduced and increased chamber volume caused by movement of a piston is larger than volume of oil supplied to calipers, and a method for controlling the brake system.

Technical Solution

In accordance with an aspect of the present disclosure, an electronic brake system includes a caliper provided on each wheel configured to perform braking; a detector configured to measure a driver's step force or detect a braking pressure generated by the caliper; and a controller controls a rotational speed of the motor based on a first rotation speed of the motor calculated based on a change in the magnitude of the braking pressure generated by the caliper, and a second rotation speed of the motor based on a change in the magnitude of the step force when the change in the magnitude of the step force satisfies a predetermined criterion.

The first rotation speed may be generated based on information about pressure and speed of oil received from the calipers.

The second rotation speed may be a target speed of the motor which corresponds to the change in the magnitude of the step force.

The controller may control the rotation speed of the motor when the first rotation speed is smaller than the second rotation speed.

The controller may control the rotation speed of the motor to the first rotation speed.

The controller may, when the first rotation speed is higher than the second rotation speed, calculate a marginal control amount based on an error between the first rotation speed and the second rotation speed, and determine the final motor control speed based on an error between the calculated marginal control amount and an excess control amount.

The excess control amount may be adjusted based on a magnitude of the marginal control amount.

The controller may determine the step force satisfied the predetermined criterion when the magnitude of the step force decreased per unit time satisfies a preset value.

The controller may determine the step force satisfied the predetermined criterion when the volume per unit time of oil flowing from the caliper is greater than the volume change per unit time of the pressure chamber.

In accordance with another aspect of disclosure, a method for controlling an electronic brake system comprises sensing step force applied to a brake pedal and pressure generated by the caliper; calculating a first rotation speed of the motor calculated based on a change in the magnitude of the braking pressure generated by the caliper, and a second rotation speed of the motor based on a change in the magnitude of the step force when the change in the magnitude of the step force satisfies a predetermined criterion; and Controlling the motor rotation speed based on the calculated first rotation speed and the second rotation speed.

The first rotation sped may be generated based on information about pressure and speed of oil received from the calipers.

The second rotation speed may be a target speed of the motor which corresponds to the change in the magnitude of the step force.

Controlling the motor rotation speed may comprise controlling the rotation speed of the motor when the first rotation speed is smaller than the second rotation speed.

Controlling the motor rotation speed may comprise, controlling the motor rotation speed to the first rotation speed.

Determining that the predetermined criterion is satisfied may comprise, determining the step force satisfied the predetermined criterion when the volume per unit time of oil flowing from the caliper is greater than the volume change per unit time of the pressure chamber.

Determining that the predetermined criterion is satisfied may comprise, determining the step force satisfied the predetermined criterion when the volume per unit time of oil flowing from the caliper is greater than the volume change per unit time of the pressure chamber.

The method may further comprise when the first rotation speed is higher than the second rotation speed, calculating a marginal control amount based on an error between the first rotation speed and the second rotation speed, and determining the final motor control speed based on an error between the calculated marginal control amount and an excess control amount.

The excess control amount may be adjusted based on a magnitude of the marginal control amount.

BEST MODE

Mode for Invention

It is to be appreciated that configurations in embodiments and drawings of the specification are purely exemplary and various modifications that can replace the embodiments and drawings of the specification can be made when the application is filed.

The terms used in the present application are merely used to describe specific embodiments and are not intended to limit the present disclosure. A singular expression may include a plural expression unless otherwise stated in the context.

In the following description, the terms "including" or "having" are used to indicate that features, numbers, steps, operations, components, parts or combinations thereof described in the present specification are present and presence or addition of one or more other features, numbers, steps, operations, components, parts or combinations is not excluded. In description of the present disclosure, the terms "first" and "second" may be used to describe various components, but the components are not limited by the terms. The terms may be used to distinguish one component from another component.

Hereinafter, the present disclosure will be described in detail in such a manner that it can be easily implemented by a person having ordinary knowledge in the field to which the present disclosure pertains. However, the present disclosure should not be construed as limited to the embodiments set forth herein. In addition, a detailed description of parts unrelated to the description will be omitted for clarity when the detailed description makes the subject matter obscure.

Figure 1:
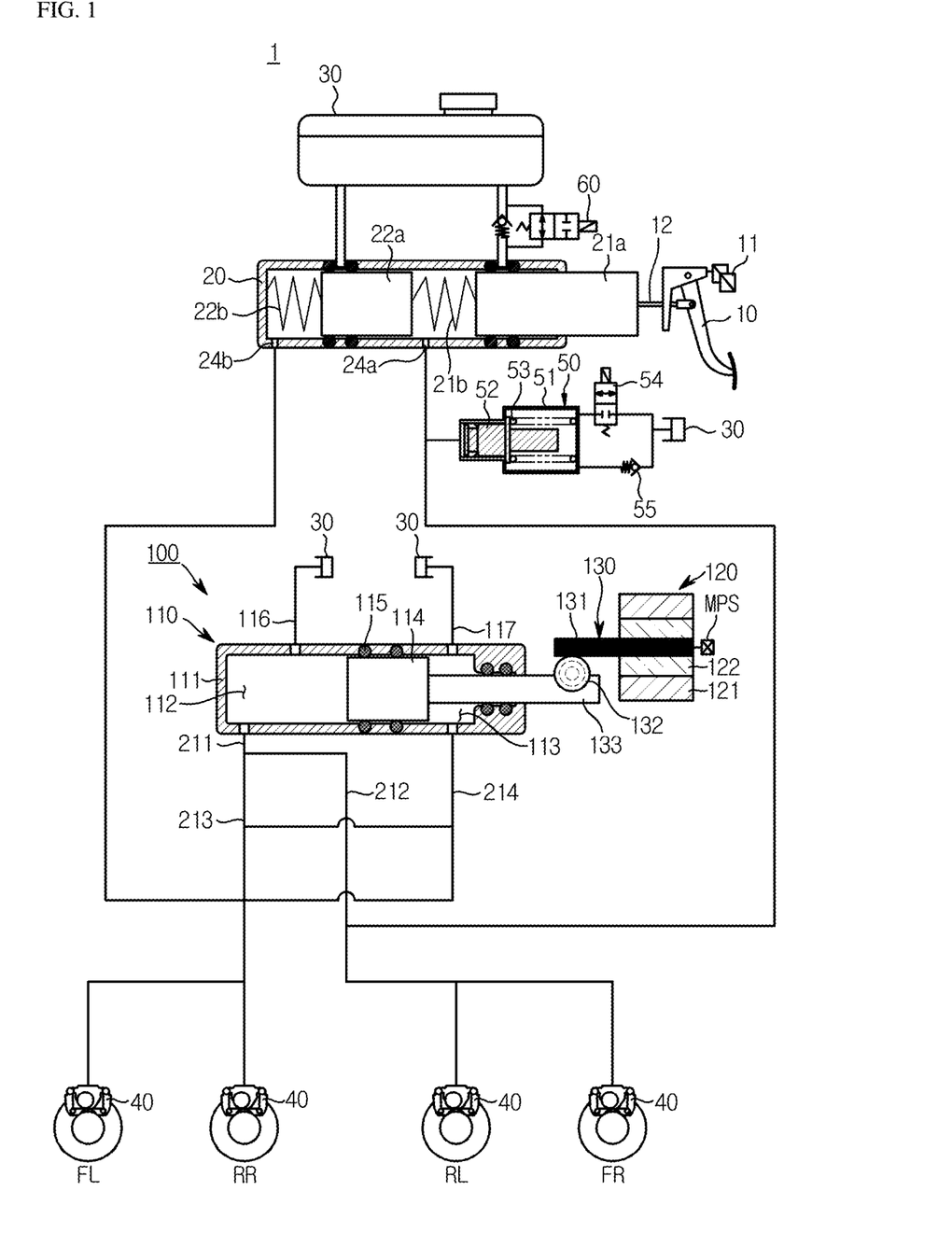
FIG. 1 is a hydraulic circuit diagram illustrating a non-braking state of an electronic brake system according to an embodiment.

FIG. 1 is a hydraulic circuit diagram illustrating a non-braking state of an electronic brake system according to an embodiment.

Referring to FIG. 1, an electronic brake system 1 may generally include a master cylinder (20) configured to generate hydraulic pressure, a reservoir (30) connected to an upper part of the master cylinder so as to store oil therein, an input rod (12) configured to pressurize the master cylinder in response to a pedal effort applied to a brake pedal, a caliper (40) configured to brake individual wheels RR, RL, FR, and FL upon receiving the hydraulic pressure, and a pedal sensor 11 configured to sense displacement of the brake pedal.

The master cylinder 20 may be configured to include at least one chamber to generate a hydraulic pressure. As an example, the master cylinder 20 may include two chambers, and each chamber is provided with a first piston 21a connected to the input rod 12 and the second master chamber 20b may be provided with a second piston 22a. The first master chamber 20a may communicate with a first hydraulic pressure port 24a to allow the oil to flow in and out.

The master cylinder 20 may include at least one chamber to secure safety if one chamber fails. For example, each chamber may be connected to the front right wheel FR and the rear left wheel RL of the vehicle, and the remaining second master chamber may be connected to the front left wheel FL and the rear right wheel RR of the. As described above, the first and second master chambers may be independently configured such that braking of the vehicle may be possible even when one of the first and second master chambers fails.

Unlike the one illustrated in the drawing, one master chamber of two master chambers may be connected to the two front wheels FR and FL, and the remaining master chamber may be connected to the two rear wheels RR and RL. That is, the position of the wheel connected to the chamber of the master cylinder 20 may be configured in various ways.

Also, a first spring 21b may be provided between the first piston 21a and the second piston 22a of the master cylinder 20, and a second spring 22b may be provided between the second piston 22a and a distal end of the master cylinder 20.

That is, the first spring 21b and the second spring 22b may be accommodated in the each chamber, and the first spring 21b and the second spring 22b are compressed by the first piston 21a and the second piston 22a which move as a displacement of the brake pedal 10 is varied, and thus an elastic force is stored. Further, when a force pushing the first piston 21a is less than the elastic force, the first spring 21b and the second spring 22b may use the stored restoring elastic force to push the first and second pistons 21a and 22a, respectively and return the first and second pistons 21a and 22a to their original positions.

The input rod 12 configured to pressurize the first piston 21a of the master cylinder 20 may be in close contact with the first piston 21a. That is, there may be no gap between the master cylinder 20 and the input rod 12. Consequently, when the brake pedal 10 is depressed, the master cylinder 20 may be directly pressurized without a pedal dead stroke section.

The simulation device 50 may provide a reaction force according to the step force of the brake pedal 10. By providing reaction force as much as compensating for the driver's response, the driver can adjust the braking force precisely as intended.

Referring to FIG. 1, the simulation device 50 includes a simulation chamber 51 provided to store oil flowing out from the first hydraulic pressure port 24a of the master cylinder 20, a reaction force piston 52 provided inside the simulation chamber 51, a pedal simulator provided with a reaction force spring 53 that is configured to elastically support the reaction force piston 52, and a simulator valve 54 connected to a rear end part of the simulation chamber 51.

The reaction force piston 52 and the reaction force spring 53 are installed to have a predetermined range of a displacement within the simulation chamber 51 by oil flowing therein.

Meanwhile, the reaction force spring 53 is only one embodiment capable of providing the elastic force to the reaction force piston 52, and may include various embodiments capable of storing the elastic force by deforming the shape. For example, the reaction force spring 53 may be made of a material such as rubber, or may include various members capable of storing the elastic force by having a coil or a plate shape.

The simulator valve 54 may be provided in a flow path connecting the rear end of the simulation chamber 51 and the reservoir 30. The front end of the simulation chamber 51 may be connected to the master cylinder 20, and the rear end of the simulation chamber 51 may be connected to the reservoir 30 through the simulator valve 54. Therefore, even when the reaction force piston 52 is returned, the oil of the reservoir 30 is introduced through the simulator valve 54 so that the entire interior of the simulation chamber 51 may be filled with oil.

Meanwhile, several reservoirs 30 are shown in the figure, and each reservoir 30 uses the same reference numeral. However, these reservoirs may be provided with the same parts or different parts. For example, the reservoir 30 connected to the simulation apparatus 50 may be the same as the reservoir 30 connected to the master cylinder 20, or may store oil separately from the reservoir 30 connected to the master cylinder 20.

The simulator valve 54 may be configured with a normally closed type solenoid valve that is usually kept in a closed state. When the driver applies a pedal effort to the brake pedal 10, the simulator valve 54 may be opened to deliver oil into the simulation chamber 51 to the reservoir 30.

Also, a simulator check valve 55 may be installed to be connected in parallel with the simulator valve 54 between the pedal simulator and the reservoir 30. The simulator check valve 55 may allow the oil in the simulation chamber 51 to flow into the first master chamber 20a and may block the oil in the first master chamber 20a from flowing toward the simulation chamber 51 through a flow path at which the simulator check valve 55 is installed. Therefore, a quick return of the pedal simulator pressure may be secured because the oil in the simulation chamber 51 can escape through the simulator check valve 55 when the brake pedal 10 is released.

The operation of the simulation device 50 will be described. The oil introduced through the open simulator valve 54 presses the reaction force piston 52 of the pedal simulator and the oil in the simulation chamber 51 pushing the reaction force piston 52 while compressing the reaction force spring 53 is transmitted to the reservoir 30 when the driver applies pressure to the brake pedal 10. The driver may be provided with a pedal feeling during this process.

Meanwhile, when the driver releases his or her foot from the brake pedal 10, the reaction force piston 52 with the pressure released may return to the original position by the elastic force of the reaction force spring 53, and the oil in the reservoir 30 may be filled into the simulation chamber 51 while the oil in the reservoir 30 flows into the simulation chamber 51. Meanwhile, the oil filled into the front end of the reaction force piston 52 in the simulation chamber 51 may be returned to the master cylinder 20 through the flow path in which the simulator valve 54 is installed and the flow path in which the simulator check valve 55 is installed.

As described above, since the inside of the simulation chamber 51 is always filled with the oil in the braking state and the releasing state, the friction of the reaction force piston 52 may be minimized during operation of the simulation device 50, so that the durability of the simulation device 50 can be improved and the inflow of foreign matter from the outside may be blocked.

The electronic brake system 1 according to an embodiment includes a hydraulic-pressure supply device 100 that operates mechanically by receiving a driver's braking intention from the pedal displacement sensor 11 detecting the displacement of the brake pedal 10 as an electrical signal.

The hydraulic-pressure supply device 100 may include a hydraulic pressure providing unit 110 providing oil pressure transmitted to the caliper 40, a motor 120 generating a rotational force by an electrical signal of the pedal displacement sensor 11, and a power converter for converting the rotational movement of the motor 120 to a linear movement to transmit to the hydraulic pressure providing unit (110).

Figure 2:
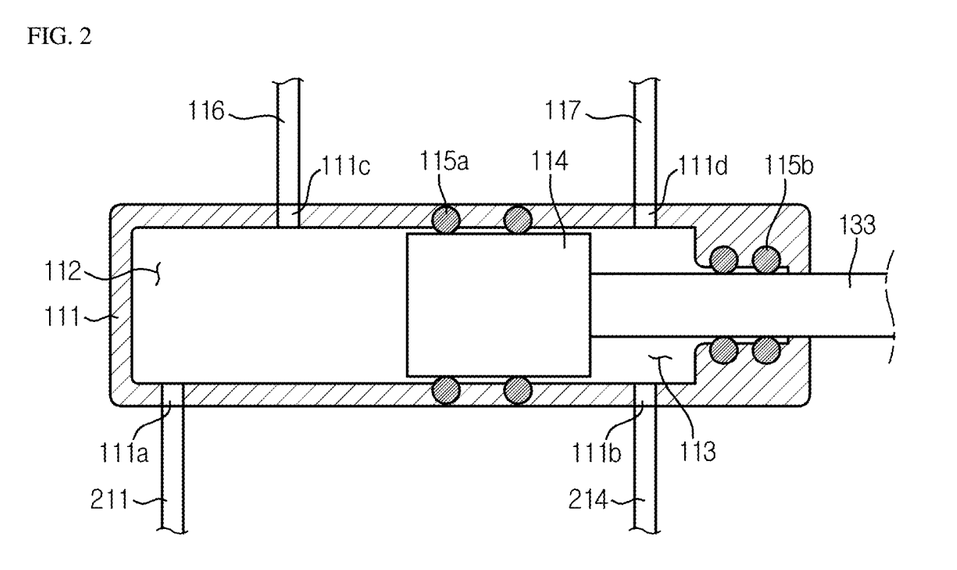
FIG. 2 is an enlarged view illustrating a hydraulic-pressure providing unit contained in the electronic brake system according to an embodiment of the present disclosure.

Next, the hydraulic pressure providing unit 110 according to an embodiment will be described with reference to FIG. 2. FIG. 2 is an enlarged view illustrating the hydraulic pressure providing unit 110 according to an embodiment.

The hydraulic-pressure supply unit 110 includes a cylinder block 111 in which a pressure chamber for receiving oil is formed, a hydraulic piston 114 accommodated in the cylinder block 111, the sealing members 115 (115a, 115b) provided between a hydraulic piston 114, and a cylinder block 111 to seal the pressure chamber and the driving shaft 133 connected to the rear end of the hydraulic piston 114 to transfer the power output from the power conversion unit 130 to the hydraulic piston 114.

The pressure chamber is located in the first pressure chamber 112 located in front of the hydraulic piston 114 (forward direction, left direction in the drawing), and a second pressure chamber 113 located in the rear of the hydraulic piston 114 (reverse direction, right direction of the drawing). That is, the first pressure chamber 112 is partitioned by the front end of the cylinder block 111 and the hydraulic piston 114, the volume is provided to vary according to the movement of the hydraulic piston 114, the second pressure chamber 113 is partitioned by the rear end of the cylinder block 111 and the hydraulic piston 114, and the volume is provided in accordance with the movement of the hydraulic piston 114.

The first pressure chamber 112 is connected to the first hydraulic passage 211 through the first communication hole 111a formed at the rear side of the cylinder block 111 and is formed at the front side of the cylinder block 111. It may be connected to the fourth hydraulic passage 214 through the second communication hole 111b.

The sealing member 115 is provided between the hydraulic piston 114 and the cylinder block 111 to seal the piston sealing member 115a and the drive shaft 133 to seal between the first pressure chamber 112 and the second pressure chamber 113. And a drive shaft sealing member 115b provided between the cylinder block 111 and sealing the opening of the second pressure chamber 113 and the cylinder block 111. That is, the hydraulic pressure or the negative pressure of the first pressure chamber 112 generated by the forward or backward of the hydraulic piston 114 is blocked by the piston sealing member 115a and is not leaked to the second pressure chamber 113 without first leaking. And fourth hydraulic flow paths 211 and 214.

The first and second pressure chambers 112 and 113 are connected to the reservoir 30 by dump passages 116 and 117, respectively, and the oil may be supplied from the reservoir 30 and stored the oil of the first or second pressure chambers 112 and 113 to transfer to the reservoir 30. For example, the dump passages 116 and 117 are branched from the first pressure chamber 112 and connected to the reservoir 30 and branched from the second pressure chamber 113 and connected to the reservoir 30.

A first communication hole 111a communicating with the first hydraulic flow path 211 is formed in front of the first pressure chamber 112. A second communication hole 111b communicating with the fourth hydraulic flow path 214 may be formed at the rear of the first pressure chamber 112. In addition, a third communication hole 111c communicating with the first dump passage 116 may be further formed in the first pressure chamber 112.

In addition, the second pressure chamber 113 has a third communication hole 111c communicating with the third hydraulic flow path 213, and a fourth communication hole 111d communicating with the second dump passage 117.

Next, the motor 120 and the power converter 130 of the hydraulic-pressure supply device 100 will be described.

The motor 120 is a device that generates a rotational force by a signal output from an electronic control unit (ECU, not shown), and may generate the rotational force in a forward or reverse direction. Rotational angular velocity and rotational angle of the motor 120 can be precisely controlled. Since the motor 120 is a well-known technique already known, a detailed description thereof will be omitted.

Meanwhile, the electronic control unit may control various valves included in the electronic brake system 1 of the disclosure, which will be described later, including the motor 120.

The driving force of the motor 120 generates a displacement of the hydraulic piston 114 through the power converter 130, and the hydraulic pressure generated as the hydraulic piston 114 slides in the pressure chamber is transferred to the calipers 40 installed at the wheels RR, RL, FR, and FL through the first and second hydraulic passages 211 and 212.

The power converter 130 is a device for converting a rotational force into a linear motion, for example, may be composed of a worm shaft 131, a worm wheel 132 and a drive shaft 133.

The worm shaft 131 may be integrally formed with the rotation shaft of the motor 120, and a worm is formed on an outer circumferential surface thereof so as to engage with the worm wheel 132 to rotate the worm wheel 132.

The worm wheel 132 is connected to mesh with the drive shaft 133 to linearly move the drive shaft 133, and the drive shaft 133 is connected to the hydraulic piston 114 to slide the hydraulic piston 114 in the cylinder block 111.

To describe the above operations again, the signal detected by the pedal displacement sensor 11 while the displacement occurs in the brake pedal 10 is transmitted to the electronic control unit (ECU, not shown), the electronic control unit drives the motor 120 in one direction to rotate the worm shaft 131 in one direction. The rotational force of the worm shaft 131 is transmitted to the drive shaft 133 via the worm wheel 132, and the hydraulic piston 114 connected to the drive shaft 133 moves forward to generate hydraulic pressure in the first pressure chamber 112.

On the contrary, when the stepping force is removed from the brake pedal 10, the electronic control unit drives the motor 120 in the opposite direction so that the worm shaft 131 rotates in the opposite direction. Accordingly, the worm wheel 132 also rotates in reverse and generates a negative pressure in the first pressure chamber 112 while the hydraulic piston 114 connected to the drive shaft 133 returns (reverses).

On the other hand, the hydraulic and negative pressure can be generated in the opposite direction. That is, the signal detected by the pedal displacement sensor 11 while the displacement occurs in the brake pedal 10 is transmitted to the electronic control unit (ECU, not shown), and the electronic control unit drives the motor 120 in the opposite direction to rotate the worm shaft 131 in the opposite direction. The rotational force of the worm shaft 131 is transmitted to the drive shaft 133 via the worm wheel 132, and the hydraulic piston 114 connected to the drive shaft 133 moves backward to generate a hydraulic pressure in the second pressure chamber 113.

On the contrary, when the stepping force is removed from the brake pedal 10, the electronic control unit drives the motor 120 in one direction so that the worm shaft 131 rotates in one direction. Accordingly, the worm wheel 132 also rotates in the opposite direction and generates a negative pressure in the second pressure chamber 113 while the hydraulic piston 114 connected to the drive shaft 133 is returned (moving forward).

As such, the hydraulic-pressure supply device 100 serves to transfer the hydraulic pressure to the caliper 40 or to suck the hydraulic pressure to the reservoir 30 according to the rotational direction of the rotational force generated from the motor 120.

Figure 3:
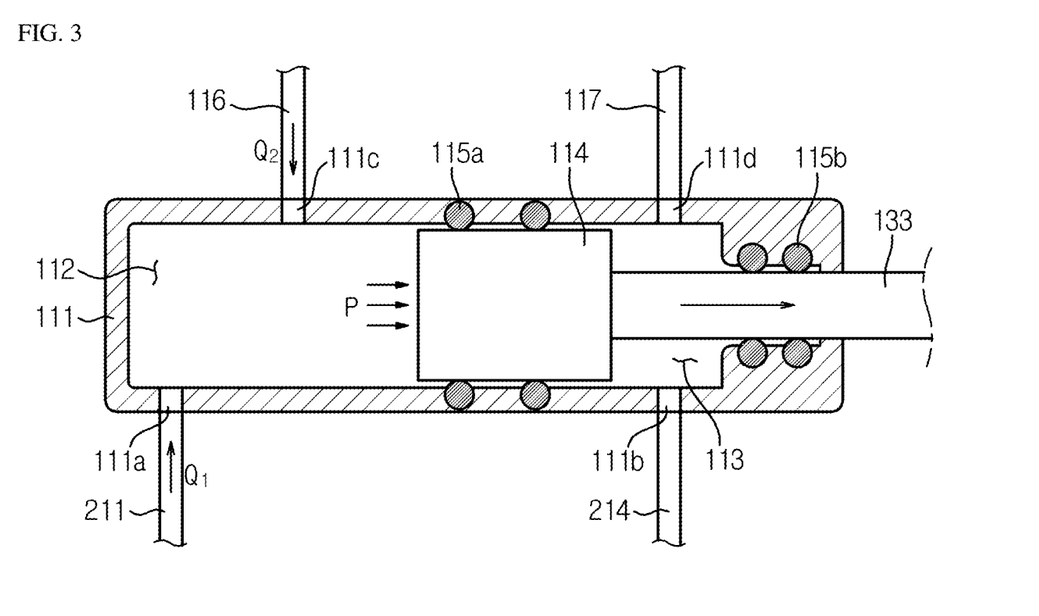
FIG. 3 is a conceptual diagram illustrating flow of oil encountered in a hydraulic-pressure providing unit.

FIG. 3 is a view showing the oil-flow generated in the hydraulic-pressure supply unit 110 according to an embodiment of FIG. 2.

Generally, the rotation speed of the motor 120 may be determined in response to the magnitude of pressure applied to the brake pedal 10 depressed by a user (i.e., the driver), and the magnitude of pressure generated by the calipers 40 may be dependent upon the rotation speed of the motor 120. Therefore, if the user reduces the magnitude of pressure applied to the brake pedal 10, the rotation speed of the motor 120 may be increased by the magnitude of reduced pressure so as to reduce the magnitude of pressure generated by the calipers 40.

In more detail, if the magnitude of pressure applied to the brake pedal 10 is reduced, the hydraulic piston 114 moves backward as shown in FIG. 3, resulting in increased volume of the first pressure chamber 112. The volume increase speed of the first pressure chamber 112 may be dependent upon the rotation speed of the motor 120. If the rotation speed of the motor 120 is high, a volume Q1 of the oil (i.e., per-unit-time oil volume) to be introduced into the calipers 40 per unit time may be larger than a per-unit-time increase volume of the first pressure chamber 112.

In this case, a passage connected to the first pressure chamber 112 may also be connected to the reservoir 30 as shown in FIG. 1, oil stored in the reservoir 30 may flow into the first pressure chamber 112, resulting in negative pressure P in the first pressure chamber 112. The negative pressure P may remain as inner residual pressure of the system, such that pressure generated by the calipers 40 is not reduced even though the rotation speed of the motor 120 increases by a predetermined speed or higher.

Hereinafter, the components and the operational flow of the electronic brake system 1 according to an embodiment will be described.

Figure 4:
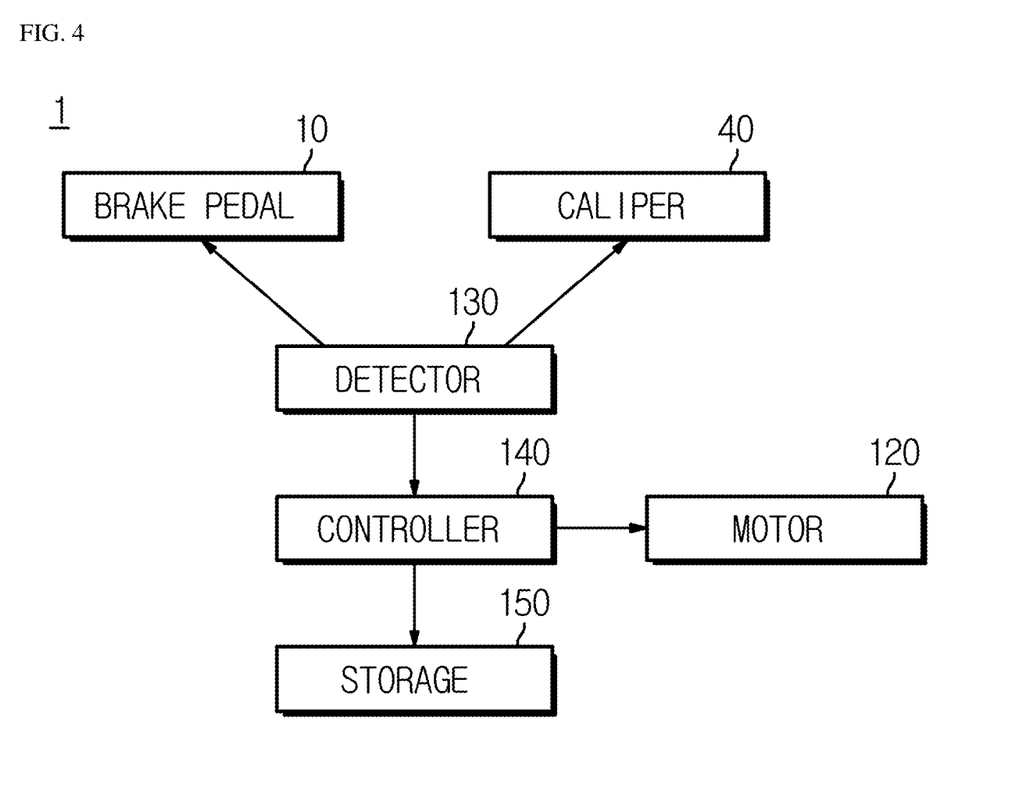
FIG. 4 is a block diagram illustrating some components of an electronic brake system according to an exemplary embodiment.

FIG. 4 is a block diagram showing some components of the electronic brake system 1 according to one embodiment.

Referring to FIG. 4, an Electronic brake system 1 according to an embodiment may include brake pedal (10), caliper 40 for generating a braking force corresponding to the magnitude of the stepping force applied to the brake pedal 10, motor 120 for controlling the speed of the hydraulic piston 114, detector 130 for detecting the magnitude of the step force applied to the brake pedal 10 and the pressure generated by the caliper 40, a storage in which various types of information of the electronic brake system 1 are stored, and a controller 140 which controls the rotation speed of the motor 120 based on the first rotation speed of the motor 120 calculated based on the change in the magnitude of the pressure generated by the caliper 40 and second rotation speed of the motor 120 calculated based on the change in the magnitude of the step force.

The detector 130 may sense the magnitude of the step force applied to the brake pedal 10 and the pressure generated by the caliper 40.

In detail, when the brake 130 is applied to the brake pedal 10 and the brake pedal 10 is applied to the stepping force, the detector 130 may detect a change in the magnitude of the stepping force and transmit the detected result to the controller 140. In addition, the detected information on the pressure, speed, and volume of the oil moving per unit time from the caliper 40 are transmitted to the controller 140.

The storage 150 may include information of the electronic brake system 1 and various kinds of information of the vehicle including the electronic brake system 1. The stored information may also be used to control the rotation speed of the motor 120 based on the sensed result received by the controller 140.

In addition, the storage 140 may include a processor that generates a control signal according to a program and data stored in the vehicle 100. According to an exemplary embodiment, the storage 140 and the controller 120 may be implemented as separate memory devices and processors, or may be implemented in a single device.

When the change in the magnitude of the step force applied to the brake pedal 10 satisfies a preset criterion, the controller 140 controls the rotation speed of the motor 120 based on the first rotation speed of the motor 120 calculated based on the magnitude change of the pressure generated by the caliper 40 and the second rotation speed of the motor 120 calculated based on the magnitude change of the step force.

The preset criterion may be determined to satisfy the preset condition when the magnitude of the reduced step per unit time satisfies the preset value. The first rotation speed may be generated based on the pressure and speed of the oil flowing from the caliper 40, and the second rotation speed may mean a target speed of the motor 120 calculated in response to the change in the magnitude of the stepping force.

Since the rotational speed of the motor 120 is determined according to the magnitude of the pressure applied to the brake pedal 10, when the magnitude of the pressure applied to the brake pedal 10 decreases rapidly, the rotational speed of the motor 120 corresponds to this to Increase quickly. However, in this case, as described in FIG. 3, the residual pressure is generated inside the hydraulic pressure providing unit 10 even though the rotational speed of the motor 120 increases, which may cause a problem that the magnitude of the pressure generated by the caliper 40 does not change.

Therefore, the controller 140 calculates the first rotation speed, which is the maximum speed of the motor 120 currently available, based on the pressure and the speed of the oil flowing from the caliper 40, and controls the rotational speed of the motor 120 more efficiently by controlling the rotational speed of the motor 120 based on the second rotation speed of the motor 120 calculated corresponding to the change in the stepping force.

Specifically, when the first rotation speed is smaller than the second rotation speed, the controller 140 may control the rotational speed of the motor 120 to be the first rotation speed instead of the second rotation speed. Therefore, in this case, there is an effect of preventing unnecessary power generated by controlling the rotation speed of the motor 120 at the second rotation speed.

In addition, when the first rotation speed is larger than the second rotation speed, the controller 140 calculates a marginal control amount β according to the error between the first rotation speed and the second rotation speed, and determines the final motor control speed according to the error between the marginal control amount β and the excess control amount α.

In this case, the marginal control amount β means an error between the first rotation speed and the second rotation speed, and the excess control amount α is a predetermined value, it means the value that can be adjusted according to the error between marginal control amount and the excess control amount.

For example, if the excess control amount is greater than the marginal control amount, the value of the excess control amount is adjusted to the difference between the excess control amount and the marginal control amount. In this case, the final motor control speed may be determined by adding a marginal control amount to the second rotation speed.

Also, for example, if the excess control amount is less than the marginal control amount, but the excess control amount is greater than zero, the excess control amount can be adjusted to zero, where the final motor control speed is the value obtained by adding the excess control amount to the second rotation speed. That is, after determining the final motor control speed, the excess control amount can be adjusted to zero.

Also, for example, when the excess control amount is smaller than the marginal control amount, especially when the excess control amount is smaller than zero, the final motor control speed may be determined as the second rotation speed.

In addition, the controller 140 may determine that the preset condition is satisfied when the magnitude of the stepped power per unit time satisfies the preset value. That is, when the user abruptly reduces the amount of pressure applied to the brake pedal 10, it may be determined that the preset condition is satisfied. Therefore, the preset value is not limited to any particular value but may be set to various values according to the purpose according to the use environment.

In addition, when the volume per unit time of the oil flowing from the caliper 40 is greater than the volume change per unit time of the first pressure chamber 112, the controller 140 may determine that the preset condition is satisfied. Under the above conditions, since the negative pressure may occur in the hydraulic-pressure supply unit 110, it may be determined that the preset conditions are satisfied in the above-described condition, thereby controlling the rotational speed of the motor 120 to prevent the occurrence of the negative pressure.

Figure 5:
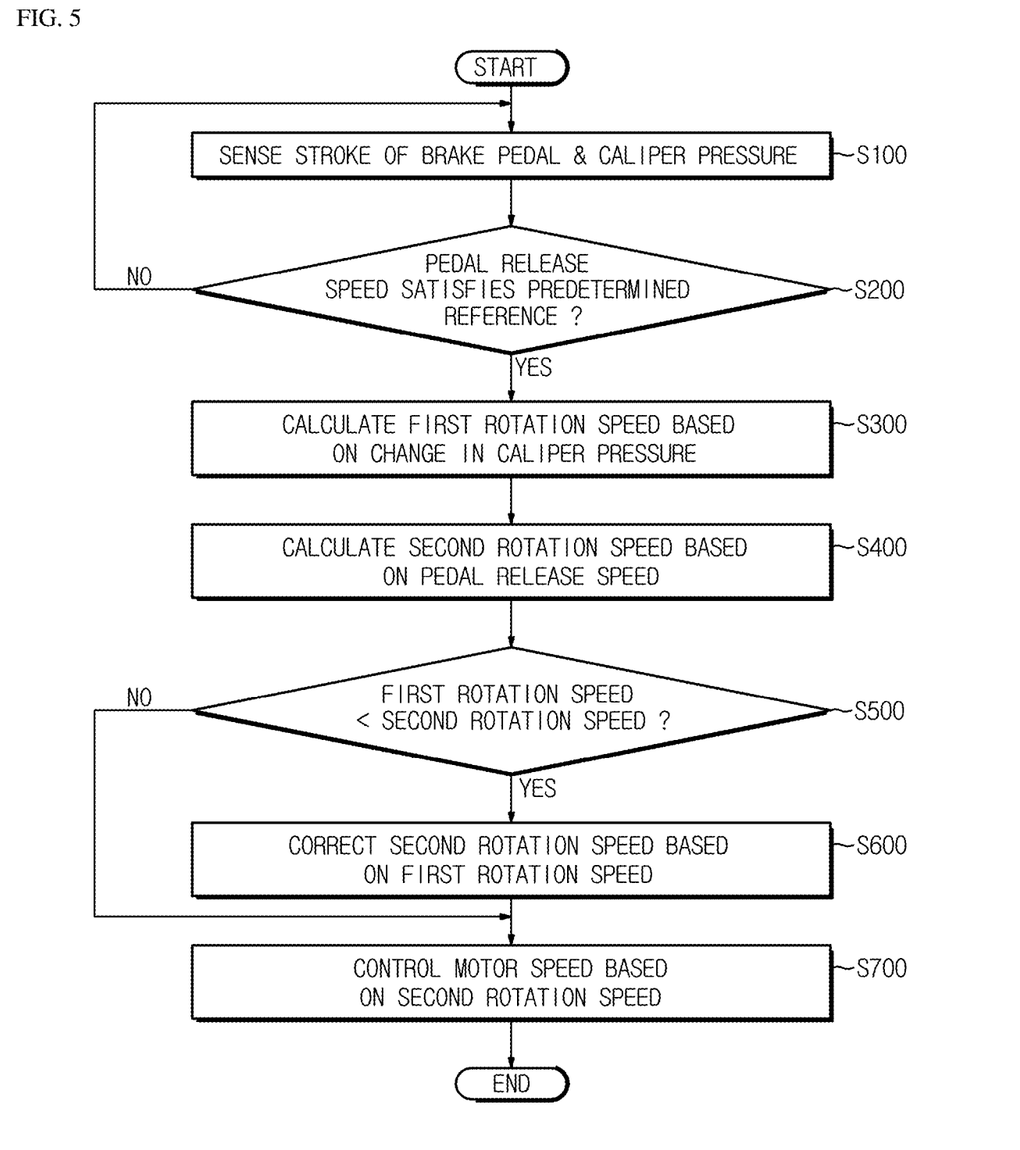
FIG. 5 is a flowchart illustrating method for controlling the electronic brake system according to the embodiments of the present disclosure.

FIG. 5 is a flowchart illustrating methods for controlling the electronic brake system 1 according to the embodiments of the present disclosure.

Referring to FIG. 5, the electronic brake system 1 may sense not only a stroke of the brake pedal, but also the magnitude of pressure produced by the calipers 40 (S100).

The electronic brake system 1 may determine whether the pedal release speed satisfies a predetermined reference value (S200).

In more detail, if the pedal release speed satisfies the predetermined value, this means that a predetermined condition has been satisfied.

If the predetermined condition has been satisfied, the electronic brake system 1 may calculate the first rotation speed based on the change in caliper pressure (S300), and may calculate the second rotation speed based on the pedal release speed (S400).

The predetermined condition, the first rotation speed, and the second rotation speed have already been disclosed in FIG. 4, and as such a detailed description thereof will herein be omitted for convenience of description.

The electronic brake system 1 may determine whether the first rotation speed is less than the second rotation speed (S400).

Generally, since the rotation speed of the motor 120 is determined based on the pedal release speed, the second rotation speed generated based on the change of the pedal release speed may correspond to a current target rotation speed of the motor 120.

If the first rotation speed is less than the second rotation speed (S500), there is a possibility that negative pressure occurs, such that a process for controlling the rotation speed of the motor 120 using the second rotation speed may encounter unnecessary power consumption. Therefore, the rotation speed of the motor 120 may be controlled at the second rotation speed that is corrected based on the first rotation speed (S600).

If there is a possibility that negative pressure occurs, the electronic brake system 1 may control the rotation speed of the motor 120 to be less than the second rotation speed, such that unnecessary power consumption caused when the motor 120 is controlled at the second rotation speed can be prevented, and negative pressure generable in the hydraulic-pressure providing unit 110 can also be prevented.

However, if the first rotation speed is higher than the second rotation speed, the rotation speed of the motor 120 can be continuously controlled at the second rotation speed.

Although the above-mentioned embodiments of the present disclosure have been disclosed herein merely for illustrative purposes, the scope or spirit of the embodiments is not limited thereto, and those skilled in the art will appreciate that various modifications, additions and substitutions are possible, without departing from the scope and spirit of the disclosure as disclosed in the accompanying claims. For example, adequate effects of the present disclosure may be achieved even if the foregoing processes and methods may be carried out in different order than described above, and/or the aforementioned elements, such as systems, structures, devices, or circuits, may be combined or coupled in different forms and modes than described above or be substituted or switched with other components or equivalents. Therefore, other implementations, other embodiments, and all changes coming within the equivalency range of the appended claims are intended to be embraced therein.

As is apparent from the above description, the electronic brake system according to the embodiments of the present disclosure may control rotation speed of a motor based on pressure generated by calipers, thereby efficiently preventing residual pressure from occurring in the electronic brake system.

Although a few embodiments of the present disclosure have been shown and described, it would be appreciated by those skilled in the art that changes may be made in these embodiments without departing from the principles and spirit of the invention, the scope of which is defined in the claims and their equivalents.

The invention claimed is:

1. An electronic brake system comprising:
a caliper provided on each wheel configured to perform braking;
a detector configured to measure a driver's step force and detect a braking pressure generated by the caliper; and
a controller controls a rotational speed of the motor based on a first rotation speed of the motor calculated based on a change in the magnitude of the braking pressure generated by the caliper, and a second rotation speed of the motor based on a change in the magnitude of the step force when the change in the magnitude of the step force satisfies a predetermined criterion.

2. The system according to claim 1, wherein the first rotation speed is generated based on information about pressure and speed of oil received from the caliper.

3. The system according to claim 1, wherein the second rotation speed is a target speed of the motor which corresponds to the change in the magnitude of the step force.

4. The system according to claim 1, wherein the controller controls the rotation speed of the motor to be the first rotation speed when the first rotation speed is smaller than the second rotation speed.

5. The system according to claim 4, wherein the controller controls the rotation speed of the motor to the first rotation speed.

6. The system according to claim 1, wherein the controller, when the first rotation speed is higher than the second rotation speed, calculates a marginal control amount based on an error between the first rotation speed and the second rotation speed, and determines a final motor control speed based on an error between the calculated marginal control amount and an excess control amount.

7. The system according to claim 6, wherein the excess control amount is adjusted based on a magnitude of the marginal control amount.

8. The system according to claim 1, wherein the controller determines the step force satisfied the predetermined criterion when the magnitude of the step force decreased per unit time satisfies a preset value.

9. The system according to claim 8, wherein the controller determines the step force satisfied the predetermined criterion when a volume per unit time of oil flowing from the caliper is greater than a volume change per unit time of a pressure chamber.

10. A method for controlling an electronic brake system comprising:
sensing step force applied to a brake pedal and pressure generated by a caliper;
calculating a first rotation speed of the motor calculated based on a change in the magnitude of a braking pressure generated by the caliper, and a second rotation speed of the motor based on a change in the magnitude of the step force when the change in the magnitude of the step force satisfies a predetermined criterion; and
controlling the motor rotation speed based on the calculated first rotation speed and the second rotation speed.

11. The method according to claim 10, wherein the first rotation sped is generated based on information about pressure and speed of oil received from the caliper.

12. The method according to claim 10, wherein the second rotation speed is a target speed of the motor which corresponds to the change in the magnitude of the step force.

13. The method according to claim 10, wherein controlling the motor rotation speed comprises, controlling the rotation speed of the motor when the first rotation speed is smaller than the second rotation speed.

14. The method according to claim 13, wherein controlling the motor rotation speed comprises, controlling the motor rotation speed to the first rotation speed.

15. The method according to claim 13, wherein determining that the predetermined criterion is satisfied comprises, determining the step force satisfied the predetermined criterion when a volume per unit time of oil flowing from the caliper is greater than a volume change per unit time of a pressure chamber.

16. The method according to claim 10, wherein determining that the predetermined criterion is satisfied comprises, determining the step force satisfied the predetermined criterion when a volume per unit time of oil flowing from the caliper is greater than a volume change per unit time of a pressure chamber.

17. The method according to claim 10 further comprising: when the first rotation speed is higher than the second rotation speed, calculating a marginal control amount based on an error between the first rotation speed and the second rotation speed, and determining a final motor control speed based on an error between the calculated marginal control amount and an excess control amount.

18. The method according to claim 17, wherein the excess control amount is adjusted based on a magnitude of the marginal control amount.

* * * * *